(12) United States Patent
Kurtz et al.

(10) Patent No.: US 12,236,392 B2
(45) Date of Patent: Feb. 25, 2025

(54) COMMUNICATIONS PROTOCOL METHOD

(71) Applicant: Walmart Apollo, LLC, Bentonville, AR (US)

(72) Inventors: Tina M. Kurtz, Rogers, AR (US); Kyle F. Graham, Rogers, AR (US); David M. Nelms, Rogers, AR (US); Stephanie Garman, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/380,794

(22) Filed: Oct. 17, 2023

(65) Prior Publication Data
US 2024/0054445 A1   Feb. 15, 2024

Related U.S. Application Data

(63) Continuation of application No. 15/413,693, filed on Jan. 24, 2017, now abandoned.

(60) Provisional application No. 62/286,751, filed on Jan. 25, 2016.

(51) Int. Cl.
*G06Q 30/00* (2023.01)
*G06Q 10/0836* (2023.01)
*G06Q 30/0601* (2023.01)
*H04W 4/021* (2018.01)

(52) U.S. Cl.
CPC ..... *G06Q 10/0836* (2013.01); *G06Q 30/0633* (2013.01); *H04W 4/021* (2013.01)

(58) Field of Classification Search
CPC .............................. G06Q 30/06–08
See application file for complete search history.

(56) References Cited

U.S. PATENT DOCUMENTS

| 2004/0035644 | A1 | 2/2004 | Ford |
| 2012/0209557 | A1 | 8/2012 | Crandall |
| 2012/0209657 | A1 | 8/2012 | Connolly |
| 2013/0346237 | A1 | 12/2013 | Rademaker |
| 2014/0074743 | A1 | 3/2014 | Rademaker |
| 2014/0249938 | A1 | 9/2014 | Garrett |

(Continued)

OTHER PUBLICATIONS

CIPO; App. No. 3,012,460; Requisition by the Examiner mailed Nov. 23, 2023; (5 pages).

(Continued)

*Primary Examiner* — Ethan D Civan
(74) *Attorney, Agent, or Firm* — Fitch, Even, Tabin & Flannery LLP

(57) ABSTRACT

A communication protocol provides for a smartphone transmitting location information to a control circuit and the control circuit then determining whether the smartphone is within a predetermined distance of a particular facility, and, when true, determining whether a temporal flag is active for the smartphone. If true, the control circuit does not respond to the smartphone. When the smartphone is within the predetermined distance of the particular facility and that temporal flag is not active, however, the control circuit transmits an in-app alert to the smartphone to provide the user with an opportunity to indicate whether the user will now take a particular action, or not. When the smartphone transmits a not-now message to the control circuit, the latter sets the aforementioned temporal flag.

10 Claims, 4 Drawing Sheets

(56) References Cited

U.S. PATENT DOCUMENTS

2014/0379529 A1* 12/2014 Agasti ............... H04W 4/029
   705/26.81
2017/0213188 A1   7/2017 Kurtz

OTHER PUBLICATIONS

"Application Allows Drive-Thru Pre-orders on Mobile Devices;" hospitalitytechnology.edgl.com/news/Application-Allows-Drive-Thru-Pre-orders-on-Mobile-Devices-76176; Hospitality Technology; Dec. 10, 2011; pp. 1-2.

Carrera; Kimberley; "Insider Q&A: March to Your Local Penguin Pick-Up Location;" http://www.dacgroup.com/blog/insider-qa-march-to-your-local-penguin-pick-up-location/; DAC Group; Sep. 11, 2015; pp. 1-23.

Epstein, Tom; "Going Mobile: Help Your Customers Spend With Mobile Apps;" http://www.franchising.com/articles/going_mobile_help_your_customers_spend_with_mobile_apps.html; Franchise Update; Sep. 11, 2015; pp. 1-5.

Impi; App. No. MX/a/2018/009072; Office Action mailed Jan. 18, 2023; pp. 1-5.

Mallik, Neha; "4 Retail Apps Leveraging Beacons in Interesting Ways;" http://blog.beaconstac.com/wp-content/uploads/2015/06/4-Retail-Apps-leveraging-Becons-in-Interesting-ways.png; Beacons; Jun. 11, 2015; pp. 1-8.

Martin, John-Paul, Max Weber, & Ben Miskie; "Fast food, faster. Enhancing the drive-thru experience through mobile ordering, payment, and rewards;" http://devpost.com/software/drivethru-club; Devpost; Sep. 11, 2015; pp. 1-5.

Nieman, Hope; "How Beacon Technology Enhances the Restaurant Customer Experience;" http://www.luxurydaily.com/how-beacon-technology-enhances-the-restaurant-customer-experience/; Luxury Daily; Sep. 11, 2015; pp. 1-4.

PCT; App. No. PCT/US2017/014706; International Search Report & Written Opinion mailed Apr. 18, 2017.

U.S. Appl. No. 15/413,693; Decision on Appeal mailed Jun. 26, 2020; (30 pages).

U.S. Appl. No. 15/413,693; Final Rejection mailed Apr. 11, 2019; (19 pages).

U.S. Appl. No. 15/413,693; Final Rejection mailed Jun. 2, 2023; (10 pages).

U.S. Appl. No. 15/413,693; Final Rejection mailed Dec. 17, 2020; (10 pages).

U.S. Appl. No. 15/413,693; Non-Final Rejection mailed Mar. 9, 2023; (10 pages).

U.S. Appl. No. 15/413,693; Non-Final Rejection mailed Sep. 4, 2020; (12 pages).

U.S. Appl. No. 15/413,693; Office Action mailed Jan. 3, 2019; (15 pages).

* cited by examiner

COMMUNICATIONS PROTOCOL METHOD

RELATED APPLICATION(S)

This application is related to U.S. patent application Ser. No. 15/413,693 filed Jan. 24, 2017, which is incorporated by reference in its entirety herein. This application claims the benefit of U.S. Provisional application No. 62/286,751, filed Jan. 25, 2016, which is incorporated by reference in its entirety herein.

TECHNICAL FIELD

These teachings relate generally to a communications protocol.

BACKGROUND

Ensuring that an item is suitably available at a facility in a manner that is both efficient and convenient for pickup by a user presents numerous challenges.

BRIEF DESCRIPTION OF THE DRAWINGS

The above needs are at least partially met through provision of the communication protocol method described in the following detailed description, particularly when studied in conjunction with the drawings, wherein.

Figure 1:
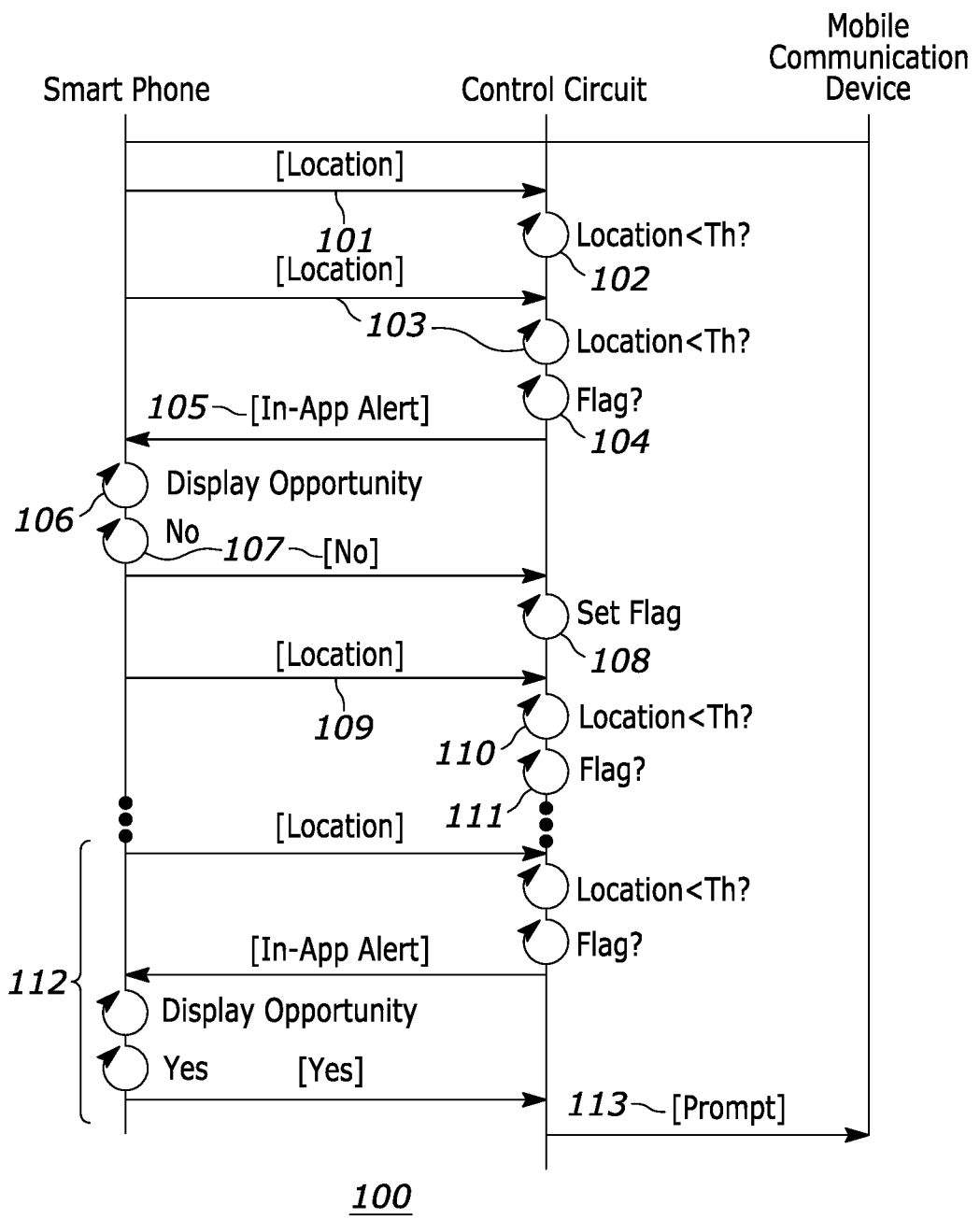
FIG. 1 comprises a communications protocol in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments provide a method for communicating amongst a control circuit, a smartphone, and a mobile communications device via a communication protocol. The foregoing includes transmitting location information from the smartphone to the control circuit and then determining, at the control circuit, whether the smartphone is within a predetermined distance of a particular facility. In response to determining that the smartphone is within the predetermined distance of the particular facility, then determining, at the control circuit, whether a temporal flag is active for the smartphone. In response to determining that the temporal flag is active for the smartphone, these teachings provide for not responding to the smartphone.

In response, however, to determining that the smartphone is within the predetermined distance of the particular facility, and further that an item is available for a user of the smartphone and that the temporal flag is not active, transmitting an in-app alert to the smartphone. In response to receiving that in-app alert at the smartphone, presenting to the user via the smartphone an opportunity to indicate whether the user will now pick up the item or not pick up the item.

At the smartphone, and in response to detecting that the user has selected not picking up the item, transmitting a corresponding not-now message to the control circuit. At the control circuit, and in response to receiving that corresponding message indicating that the user has selected not picking up the item, setting the temporal flag.

At the smartphone, and in response to detecting that the user has instead selected picking up the item, transmitting a corresponding affirmative message to the control circuit, and at the control circuit, and in response to receiving the corresponding affirmative message indicating that the user has selected picking up the item, transmitting a prompt message to the mobile communications device to alert an associate that the user will be picking up the item.

Figure 2:
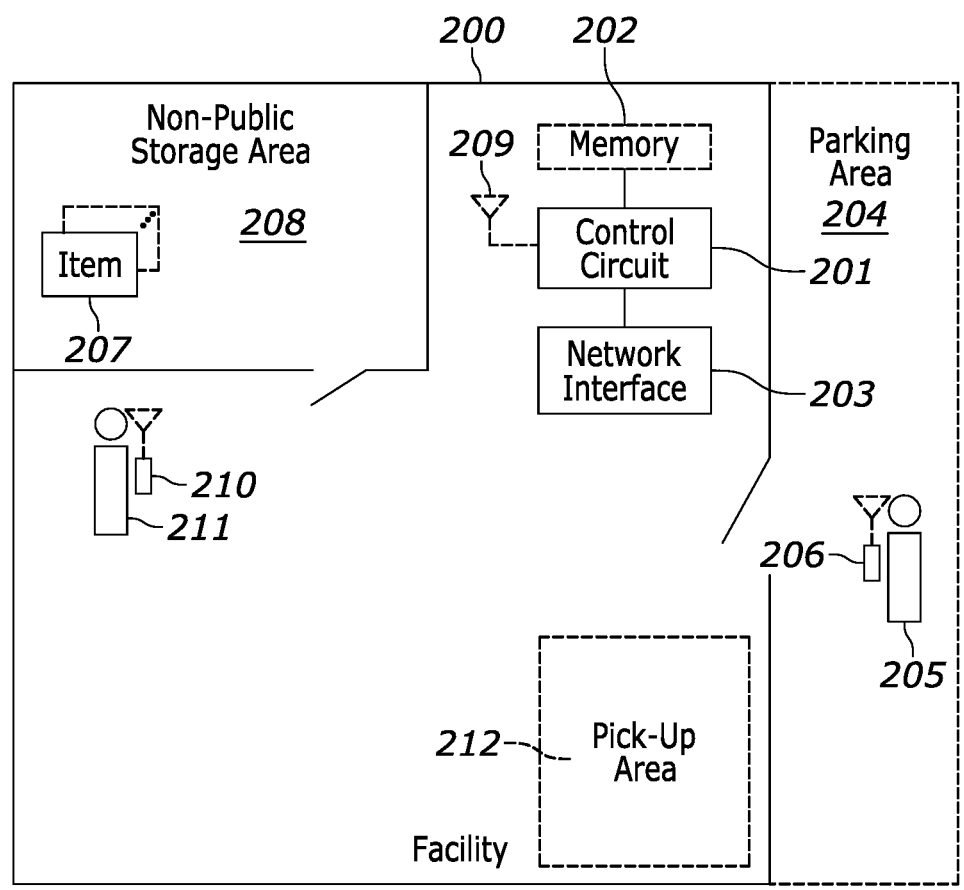
FIG. 2 comprises a block diagram as configured in accordance with various embodiments of these teachings.
Figure 3:
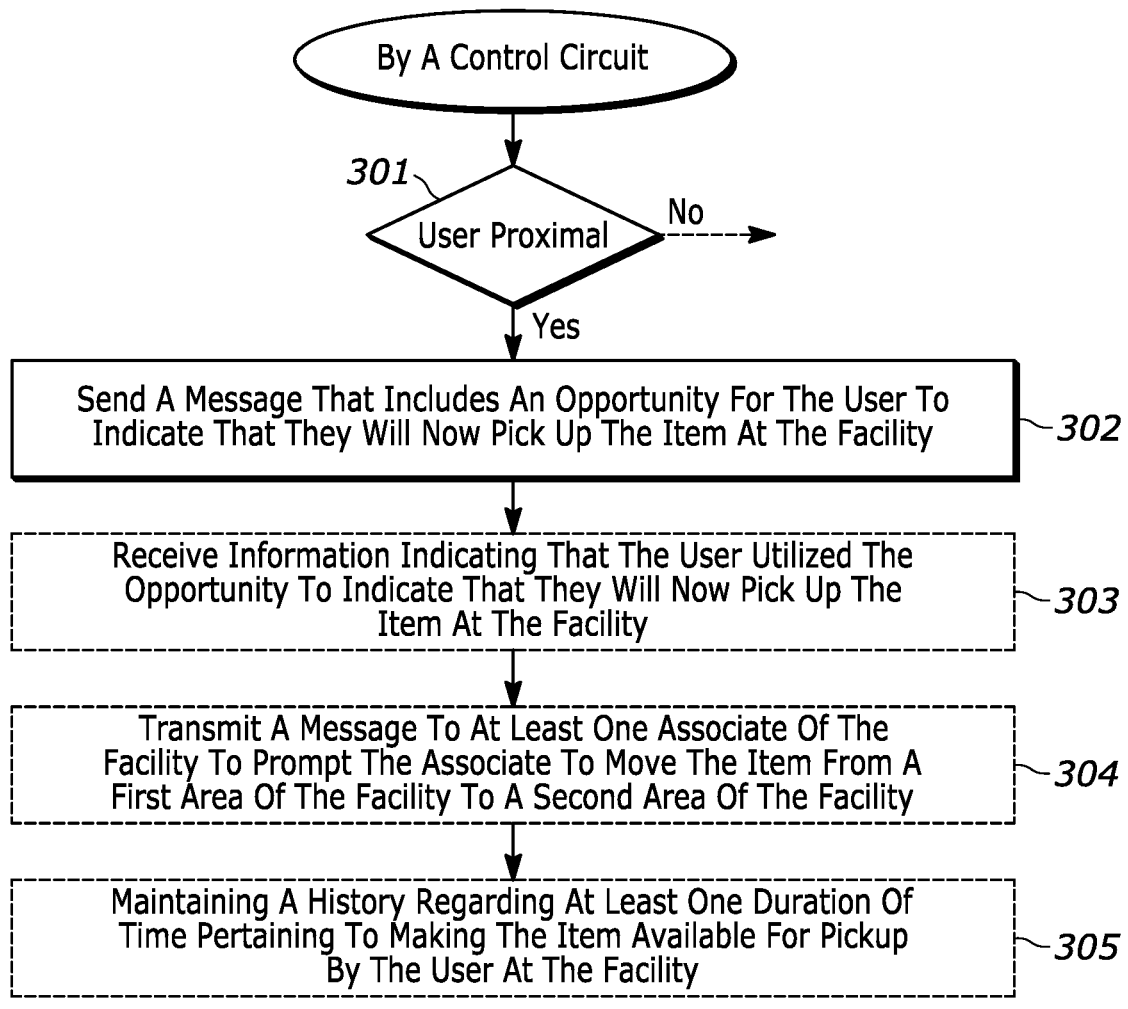
FIG. 3 comprises a flow diagram as configured in accordance with various embodiments of these teachings.
Figure 4:
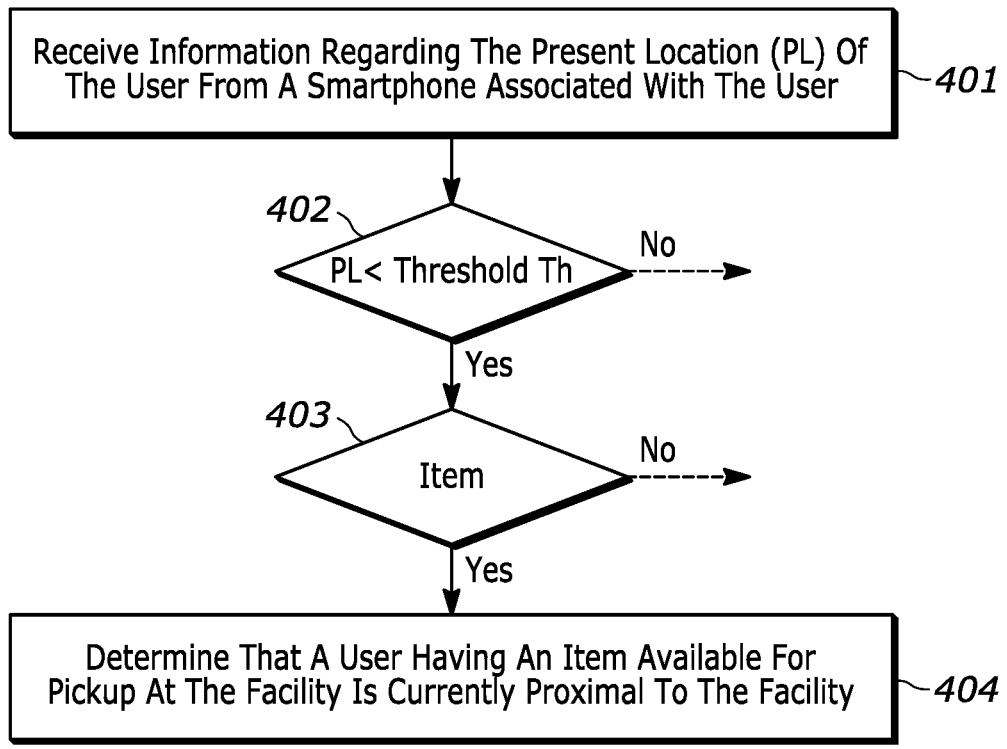
FIG. 4 comprises a flow diagram as configured in accordance with various embodiments of these teachings.

These and other benefits may become clearer upon making a thorough review and study of the following detailed description. Referring now to the drawings, and in particular to FIGS. 1, 3, and 4, an illustrative communications protocol 100 and process 300 that is compatible with many of these teachings will now be presented. For the sake of an illustrative example it will be presumed here that a control circuit, smartphone, and mobile communication device of choice carries out the actions, steps, and/or functions of this protocol 100. FIG. 2 provides an illustrative example in these regards.

The illustrative example presented in FIG. 2 includes a facility 200. This facility 200 may include one or more of parking locations, entrance and exit areas, and other areas. The facility 200 may be any size of format facility.

In this particular example, the facility 200 includes a control circuit 201. Being a "circuit," the control circuit 201 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 201 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 201 is configured (for example, by using corresponding programming as will be well understood by those skilled in the art) to carry out one or more of the steps, actions, and/or functions described herein.

By one optional approach the control circuit 201 operably couples to a memory 202. This memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

In addition to other information of interest as described herein, this memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes lined the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 201 also operably couples to a network interface 203. So configured the control circuit 201 can communicate with other elements (both within the apparatus 200 and external thereto) via the network interface 203. Network interfaces, including both wireless and non-wireless platforms, are well understood in the art and require no particular elaboration here.

In this illustrative example the facility 200 includes a parking area 204. Parking areas are generally well-understood in the art and may comprise, for example, a paved and lined open expanse. The present teachings are quite flexible in these regards and will accommodate other parking area paradigms including, for example, underground parking facilities as well as multilevel parking facilities.

Also shown in FIG. 2 is a user 205 who has, in this example, a smartphone 206 and an associate 211 of the facility 200 who has a mobile communications device 210.

With reference to FIGS. 1 through 4, at decision block 301 the control circuit 201 automatically determines when a user having an item 207 that is available for pickup at the facility 200 is also currently proximal to the facility 200. Such a determination can be carried out in any of a variety of ways. FIGS. 2 and 4 presents one illustrative example in these regards.

At block 401 the control circuit 201 receives information 101 regarding the present location of the aforementioned user 205. By one approach, and as illustrated, the control circuit 201 receives this information specifically from the aforementioned smart phone 206 that is associated with the user 205. That smartphone 206 may be equipped with a Global Positioning System (GPS) capability by which the smartphone 206 then ascertains its own present location and/or which provides location information that the smartphone 206 can simply forward (for example, to the control circuit 201). As another approach in these regards, the smartphone 206 may have a Wi-Fi capability by which the smartphone 206 can again either ascertain its own location and/or utilize for attachment purposes, where the attachment itself provides inherent information regarding a general location of the smartphone 206. These teachings will support other approaches in these regards as well.

At decision block 402 (102 in FIG. 1) the control circuit 201 can compare the aforementioned present location of the user 205 against a predetermined distance threshold Th. That threshold Th can be set as appropriate to given application setting. By one approach the predetermined distance threshold can comprise a radius from a central reference point. By another approach the predetermined distance threshold can comprise a distance from the periphery of a predetermined aTh (or thresholds) can serve to determine when the user 205 is within the facility 200 including the aforementioned parking area 204. Such an approach can be useful, for example, when it is appropriate to limit the application of the present teachings to only the local environs and boundaries of the facility 200 itself. When such is not the case, this process can accommodate any of a variety of responses. Examples of responses can include temporal multitasking (pursuant to which the control circuit 201 conducts other tasks before returning to again monitor for these described events) as well as continually looping back to essentially continuously monitor for the described event(s) as denoted by reference numeral 103 in FIG. 1. These teachings also accommodate supporting this activity via a real-time interrupt capability.

Upon determining that the customer 205 is within the predetermined distance and/or within a particular prescribed area, and as described below, the control circuit 201 can determine whether a particular flag has been set as denoted by reference numeral 104. When such is not the case, at decision block 403 the control circuit 201 determines whether there is an item 207 available at the facility 200 for pickup by the user 205.

When the foregoing considerations are true (i.e., that the user 205 has an item 207 available for pickup at the facility 200, the user 205 is sufficiently proximal to the facility 200, and the aforementioned flag has not been set), at block 404 the control circuit 201 determines that a user having an item available for pickup at the facility 200 is currently proximal to the facility 200.

In this illustrative example the user 205 is within the parking area 204 of the facility 200 and an item 207 is presently available at the facility 200. In that case, at block 302 the control circuit 201 sends an in-app message 105 to the user's smartphone 206. That message 105 includes an opportunity for the user 205 to indicate that they will now pick up the item 207 at the facility 200. By one approach the message 105 includes within itself the specifics of that opportunity. By another approach the message 105 includes that opportunity by including a trigger mechanism that prompts the user's smartphone 206 to present that opportunity (as denoted by reference numeral 106 in FIG. 1).

Figure 5:
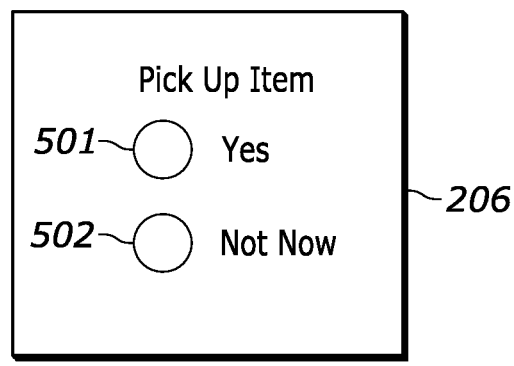
FIG. 5 comprises a screen shot as configured in accordance with various embodiments of these teachings.

Referring momentarily to FIG. 5, by one approach the foregoing can comprise presenting the user 205, via a display as comprises a part of the smartphone 206, with a simple choice between a first user-assertable button 501 to indicate that the user 205 will pick up the item at this time and a second user-assertable button 502 to indicate that the user 205 will not pick up the item at this time. By asserting one of these buttons 501 and 502, the user 205 can provide a simple selection as between these two options.

Presuming the user 205 provides a response to the aforementioned opportunity, at optional block 403 the control circuit 201 receives information indicating that the customer utilized the opportunity. When the user 205 elects to not pick up the item 207 at this time (as indicated by reference numeral 107 in FIG. 1), the control circuit 201 can flag this user 205 (as denoted by reference numeral 108) to not process further opportunities in these regards for some predetermined amount of time such as 30 minutes, one hour, or the remainder of the day. That is, if a location message 109 is received from the user's smartphone 206 within that predetermined amount of time as determined at reference numeral 110, upon determining (at reference numeral 111) that the aforementioned flag has been set the control circuit 201 to avoid sending the aforementioned in-app alert to the user such that the user 205 does not receive any such opportunity/message within that predetermined amount of time.

When the user 205 utilizes the aforementioned opportunity (either prior to the aforementioned flag being set or subsequent to when the aforementioned predetermined amount of time expires, all as represented by reference numeral 112 in FIG. 1) to indicate that they (i.e., the user 205) will now pick up the item 207 at the 200, at optional block 304 the control circuit 201 can transmit a message (113 in FIG. 1) (via, for example, a wireless capability 209 available thereto) to the aforementioned associate 211 (via the associate's corresponding mobile communications device 210) to prompt the associate 211 to move the item 207 from a first area of the facility 200 (such as, for example, a storage area 208 where the item 207 has been stored) to a second area of the facility 200 (such as a designated-area 212). The aforementioned message 113 can comprise, for example, a voice message (such as a pre-recorded voice message or a text-to-speak synthesized-voice message), a text message, an email message, or the like.

So configured, as a user 205 approaches the facility 200, with or without a present intent to receive the item 207, the control circuit 201 can be triggered to automatically provide the user 205 with an opportunity to begin the item-retrieval process before the user 205 arrives at, for example, a designated pick-area 212. The control circuit 201 can also automatically prompt an associate 211 to retrieve the item 207, again before the user 205 has presented themselves at the pick-up area 212 or even before the user 205 has necessarily entered the building itself. Accordingly, wait times during which the user 205 must wait for their item 207 can, at least in many instances, be reduced or even essentially eliminated.

By one approach, at optional block 105 the control circuit 201 can maintain a history (for example, in the aforementioned memory 202) regarding performance in the above-described regards. For example, this history can include information regarding at least one duration of time pertaining to making the item 207 available for pickup by the user 205 at the facility 200. By one approach this duration of time can pertain to the time between when the associate 211 receives the above-described prompt message 113 and when the item 207 arrives in the pick-up area 212. Metrics in these regards can then be leveraged as desired to improve performance of the process. For example, it may be ascertained through experience that waiting time for the user at a particular facility 200 can be significantly reduced by making only a small adjustment to the aforementioned predetermined distance threshold.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for communicating amongst a control circuit, a smartphone, and a mobile communications device via a communication protocol, comprising the steps of:

transmitting location information from the smartphone to the control circuit;

at the control circuit, comparing the location information against a predetermined distance threshold;

determining, at the control circuit, whether the smartphone is within a predetermined distance of a particular facility as a function of comparing the location information against the predetermined distance threshold;

in response to determining that the smartphone is within the predetermined distance of the particular facility, determining, at the control circuit, whether a temporal flag is active for the smartphone;

in response to determining that the temporal flag is active for the smartphone, not responding to the smartphone;

in response to determining that the smartphone is within the predetermined distance of the particular facility, that an item is available for a user of the smartphone, and that the temporal flag is not active, transmitting an in-app alert to the smartphone;

in response to receiving the in-app alert, and at the smartphone, presenting to the user via the smartphone an opportunity to indicate whether the user will now pick up the item or not pick up the item;

at the smartphone, and in response to detecting that the user has selected not picking up the item, transmitting a corresponding not-now message to the control circuit;

at the control circuit, and in response to receiving the corresponding message indicating that the user has selected not picking up the item, setting the temporal flag;

at the smartphone, and in response to detecting that the user has selected picking up the item, transmitting a corresponding affirmative message to the control circuit;

at the control circuit, and in response to receiving the corresponding affirmative message indicating that the user has selected picking up the item, transmitting a prompt message to the mobile communications device to alert an associate that the user will be picking up the item.

2. The method of claim 1 wherein setting the temporal flag comprises setting a flag having a set duration of time, the flag automatically resetting when the set duration of time passes.

3. The method of claim 2 wherein the set duration of time comprises thirty minutes.

4. The method of claim 2 wherein the set duration of time comprises one hour.

5. The method of claim 2 wherein the set duration of time comprises a remaining portion of a present day.

6. The method of claim 1 wherein presenting to the user via the smartphone the opportunity to indicate whether the user will now pick up the item or not pick up the item comprises presenting, on a display that comprises a part of the smartphone, two user-assertable buttons.

7. The method of claim 6 wherein a first one of the two user-assertable buttons corresponds to picking up the item and a second one of the two user-assertable buttons corresponds to not picking up the item.

8. The method of claim 1 wherein transmitting the prompt message to the mobile communications device to alert the associate that the user will be picking up the item comprises a prompt to move the item from a first area of the facility to a second area of the facility.

9. The method of claim 8 wherein the first area of the facility comprises a non-public area of the facility.

10. The method of claim 9 wherein the second area of the facility comprises a designated pick-up area.

\* \* \* \* \*